(12) United States Patent
Bhardwaj

(10) Patent No.: US 9,391,893 B2
(45) Date of Patent: Jul. 12, 2016

(54) LOOKUP ENGINE FOR AN INFORMATION HANDLING SYSTEM

(71) Applicant: DELL PRODUCTS L.P., Round Rock, TX (US)

(72) Inventor: Sanjay Bhardwaj, Fremont, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 469 days.

(21) Appl. No.: 13/777,177

(22) Filed: Feb. 26, 2013

(65) Prior Publication Data

US 2014/0244815 A1 Aug. 28, 2014

(51) Int. Cl.
 G06F 15/173 (2006.01)
 H04L 12/741 (2013.01)

(52) U.S. Cl.
 CPC .................... H04L 45/745 (2013.01)

(58) Field of Classification Search
 CPC ...... H04L 45/745; H04L 12/56; G06F 15/173
 See application file for complete search history.

(56) References Cited

U.S. PATENT DOCUMENTS

| | | | | |
|---|---|---|---|---|
| 6,460,122 B1 * | 10/2002 | Otterness | ............ | G06F 11/1076 711/122 |
| 6,687,715 B2 * | 2/2004 | Schroeder | | |
| 7,389,360 B1 * | 6/2008 | Patel et al. | ..................... | 709/238 |
| 7,818,541 B2 | 10/2010 | Rhoades et al. | | |
| 7,856,543 B2 | 12/2010 | Rhoades et al. | | |
| 8,599,853 B2 * | 12/2013 | Chidambaram | .............. | 370/392 |
| 2003/0041163 A1 * | 2/2003 | Rhoades et al. | .............. | 709/232 |
| 2004/0236720 A1 * | 11/2004 | Basso et al. | ........................ | 707/1 |
| 2006/0136570 A1 * | 6/2006 | Pandya | ............. | G06F 17/30985 709/217 |
| 2008/0126741 A1 * | 5/2008 | Triplett | ................... | G06F 9/526 711/216 |
| 2009/0201935 A1 * | 8/2009 | Hass et al. | ................ | 370/395.32 |
| 2012/0069131 A1 * | 3/2012 | Abelow | ............... | G06Q 10/067 348/14.01 |
| 2013/0097389 A1 * | 4/2013 | Suzuki | .................... | G06F 9/526 711/147 |
| 2013/0246698 A1 * | 9/2013 | Estan et al. | .................... | 711/108 |
| 2014/0195771 A1 * | 7/2014 | Adderly | ............. | G06F 12/1009 711/205 |

* cited by examiner

Primary Examiner — Benjamin M Thieu

(74) Attorney, Agent, or Firm — Haynes & Boone LLP

(57) ABSTRACT

An information handling system, device, and method are provided that perform lookups. The lookups are performed by multiple lookup cores that spatially duplicate the available access paths provided by a single lookup core that interface with memory that has been upgraded to increase its timing. As a result, the systems, methods, and devices are capable of scaling a bandwidth of packet processing using existing technologies.

17 Claims, 9 Drawing Sheets

LOOKUP ENGINE FOR AN INFORMATION HANDLING SYSTEM

BACKGROUND

1. Technical Field

Embodiments disclosed herein are related to a lookup engine for an information handling system. In particular, systems, devices, and methods disclosed herein may provide increased bandwidth in information handling systems by increasing the speed and number of communication paths on which a lookup is performed in a lookup engine.

2. Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

However, in certain information handling systems the bandwidth and speed of the system is limited by the lookup engine, which performs lookup algorithms on information in order to properly route the information to its destination. Consequently, there is a need for a lookup engine that can process lookups more quickly and efficiently.

Figure 1:
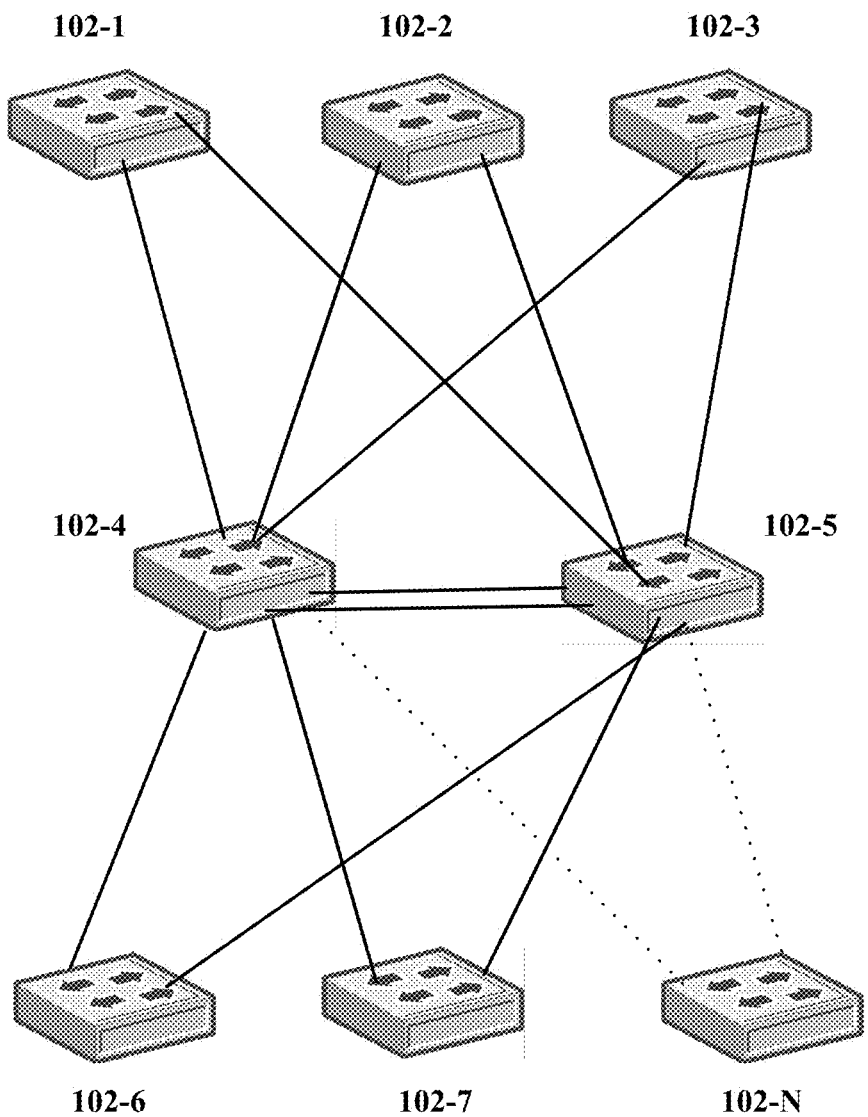
FIG. 1 shows an information handling system consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

Consistent with some embodiments, an information handling system is provided. The information handling system includes a network processing unit, the network processing unit configured to receive information, extract packets from the received information, and generate lookup packets. The information handling system also includes a lookup engine coupled to the network processing unit and configured to receive the lookup packets from the network processing unit, extract keys from the lookup packets, and perform one or more lookups based on the extracted keys. The lookup engine includes a network processor interface, a first lookup core coupled to the network processor interface, a second lookup core coupled to the network processor interface, at least one memory controller coupled to the first lookup core and the second lookup core, the at least one memory controller receiving a plurality of search requests over multiple paths from each of the first lookup core and the second lookup core, performing a lookup in a coupled memory device, and sending a lookup response. The lookup engine also includes an inter-core synchronization module coupled with the first lookup core, the second lookup core, and the network processor interface, the inter-core synchronization module receiving lookup responses from the first lookup core and the second lookup core and sending a response packet to the network processor interface when lookup responses for each key has been received.

Consistent with some embodiments, there is also provided a device for performing lookups over a plurality of network layers in an information handling system. The device includes a network processor interface configured to receive lookup packets and extract keys from the lookup packets, a first lookup core coupled to the network processor interface, and a second lookup core coupled to the network processor interface. The device also includes at least one memory controller coupled to the first lookup core and the second lookup core, the at least one memory controller receiving a plurality of search requests over multiple paths from each of the first lookup core and the second lookup core, performing a lookup in a coupled memory device, and sending a lookup response, an inter-core synchronization module coupled with the first lookup core, the second lookup core, and the network processor interface, the inter-core synchronization module receiving lookup responses from the first lookup core and the second lookup core and transmitting a response packet to the network processor interface when lookup responses for each key has been received.

Consistent with some embodiments, there is further provided a method for performing a lookup in a lookup engine of an information handling system. The method includes steps of receiving one or more keys on which a lookup will be performed, performing a lookup on each of the received one or more keys, the lookup being performed on a memory storing one or more lookup databases by sending lookup requests on a plurality of paths, receiving a lookup response for each lookup, synchronizing the lookup responses for each key of the received one or more keys, and sending a lookup response packet once all of the lookup responses have been synchronized.

These and other embodiments will be described in further detail below with respect to the following figures.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 shows an information handling system consistent with some embodiments. As shown in FIG. 1, information handling system 100 includes a plurality of nodes 102-1-102-N coupled to each other in a linked or aggregated arrangement. Consistent with some embodiments, nodes 102-1-102-N may include any appropriate combination of hardware and/or software having one or more processors and capable of reading instructions stored on a non-transitory machine-readable medium for execution by the one or more processors. According to some embodiments, nodes 102-1-102-N may correspond to network switches or routers, each of which may include at least one line card. Consistent with some embodiments nodes 102-1-102-N include a machine readable medium, such as a memory (not shown) that includes instructions for execution by one or more processors (not shown) for causing nodes 102-1-102-N to perform specific tasks. For example, such instructions may include handling and routing information. Some common forms of machine readable media includes, for example, floppy disk, flexible disk, hard disk, magnetic tape, any other magnetic medium, CD ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Consistent with some embodiments, nodes 102-1-102-N are coupled together to transmit and receive information between each other and to other nodes not shown. System 100 may represent a local area network, a wide area network, or a link aggregation group. Through communication at several abstract layers of network hierarchy, a node declares that it is present, broadcasts its capabilities and discovers its neighbors in system 100 to participate in optimal forwarding of information, such as packets, transmitted throughout system 100. Each node 102-1-102-N, has an address which locates the node on the network through varying hierarchical specifics, such as geographical location, domain, service area of the network (e.g. WAN to LAN), a group of nodes within the node and finally to the node. Information, such as packets, may be transmitted between nodes in system 100 based on the Layer 2 (L2) address, Layer 3 (L3), or higher address that specifies the destination of the information. For example, to send information from node 102-1 to node 102-2, a user at node 102-1 only needs to specify that information has to be delivered to node 102-2. Based on a dynamic database at each node, including the originating node 102-1, a next hop address in terms of an intermediate node may be determined. For example in system 100, an intermediate node may be node 102-4 or node 102-5. This involves a calculation of optimized paths based on the destination address of node 102-2, a topology of the system 100 and other parameters. Boundary checks may also be performed for the case that the destination node is directly connected to node 102-1. Since it is not possible to include a full network forwarding table, a default path is provided to forward the information to a local host which may have access at each node hierarchy to larger tables and additional processing power to determine a next hop forwarding address. Consequently, through an appropriate balance of hardware and software resources at each node, information can be transmitted and received between any set of nodes in system 100.

As part of the hardware processing at each node a header of the information containing, for example, the addresses and packet type is extracted and used to form keys. These keys may be processed by performing lookup requests in databases to generate a suitable response that determines whether the information is forwarded or discarded along with a direction of further propagation. The databases may be based on a static RAM (SRAM) where the desired information is at a fixed "known" location. The databases may be based on a dynamic random access memory (DRAM), in particular a reduced latency DRAM (RLDRAM), for storing a full data structure of next hop addresses accessed through multiple read transactions. The databases may be based on a content addressable memory (CAM), such as a ternary CAM (TCAM) that may have a fixed memory location or a location that may be determined by a SRAM access with SRAM addresses determined by a search. All of the elements of the database storage in one embodiment may be external devices. In another embodiment, the databases may be internal to the node and/or they may be provided externally through a lookup engine interface.

Figure 2:
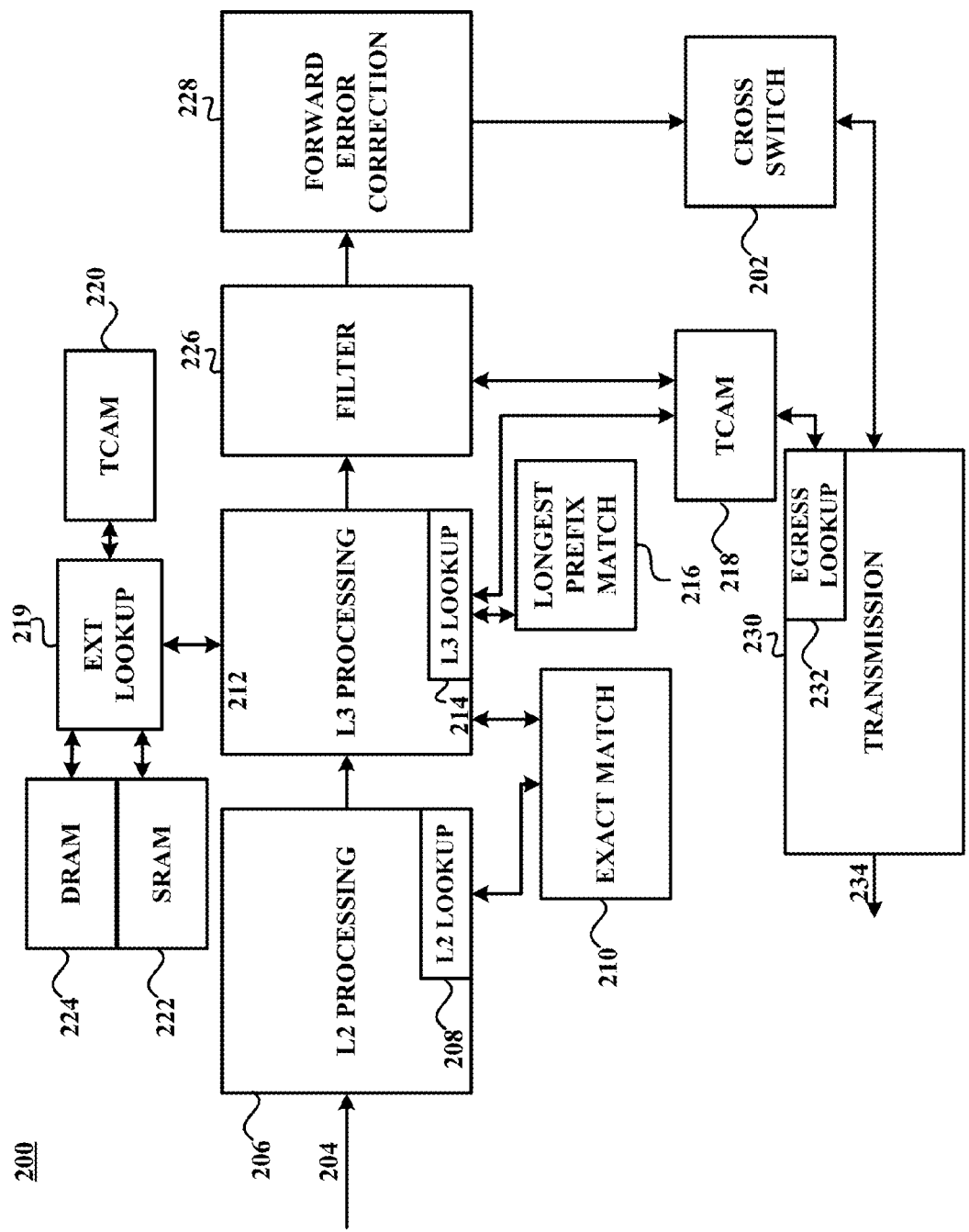
FIG. 2 is a diagram illustrating a network system within a node, consistent with some embodiments.

FIG. 2 is a diagram illustrating a network system within a node, consistent with some embodiments. As shown in FIG. 2, network system 200 may be a switch or a router or an individual line card within a switch or a router. While only one network system is shown in FIG. 2, a system can be made having a plurality of such systems 200 connected through cross switch 202. When receiving information 204, bits of the information are gathered and checked for integrity, converted into bytes and aligned, and packets are extracted from information 204 for L2 processing by L2 processing module 206. Consistent with some embodiments, the packets extracted from information 204 may include an address such as a destination address or a source address that may be used to perform switching and/or routing decisions subject to operational protocols. For Ethernet switching, a source address based lookup in L2 lookup engine 208 may be used for filtering, authentication or multicast routing. Similarly, either for Ethernet switching or for virtual LAN (VLAN), multiprotocol label switching (MPLS) or transparent interconnection of lots of links (TRILL) protocols running over Ethernet or similar data link layer, a destination address based lookup in L2 lookup engine 208 may be performed to identify the port on the present node from where the information would egress with appropriate manipulation of the headers for further propagation. Temporally optimized and constantly updated tables having L2 media access control (MAC) addresses are stored in network system 200 for the purposes of the lookup. As shown in FIG. 2, these tables may be stored in exact match database 210, and L2 lookup engine 208 may perform a lookup in exact match database 210 to determine if an exact match to a source MAC address or a destination MAC address is stored. In one embodiment, an extracted packet from the received information 204 may be forwarded from L2 processing module 206 to L3 processing module 212. Consistent with some embodiments, L3 lookup engine 214 in L3 processing module 212 may perform a lookup in exact match database 210, longest prefix match (LPM) database 216, or an internal lookup in a database stored on TCAM 218. Alternatively, L3 processing module 212 may perform an external lookup using external lookup engine 219, which performs a lookup in databases stored in external memories, such as a TCAM 220, an SRAM 222, or a DRAM 224, which may be an RLDRAM. In one embodiment, as opposed to 48 bit MAC addresses used for source address and destination address lookups performed by L2 lookup engine 208, a 32 bit address for IPv4 or up to a 128 bit address for IPv6 may be used by L3 lookup engine 214.

After performing L2 and/or L3 processing using L2 processing module 206 and/or L3 processing module 212, which may include performing an L2 lookup, an L3 lookup, and/or an external lookup, the information may be filtered by filter module 226, and then any errors due to redundant transmission may be corrected by forward error correction module 228. The information may then be transmitted to cross switch 202, where it may be sent to other network systems 200 in a node, if necessary. In one embodiment cross switch 202 may switch back to transmission module 230. Consistent with some embodiments, transmission module 230 includes an egress lookup engine 232 which may perform an egress port lookup from a database stored in TCAM 218. The results from the egress port lookup and the L2 and/or L3 processing are encapsulated into the information as part of a header in transmission module 230, and then transmitted to the next-hop address 234.

Figure 3:
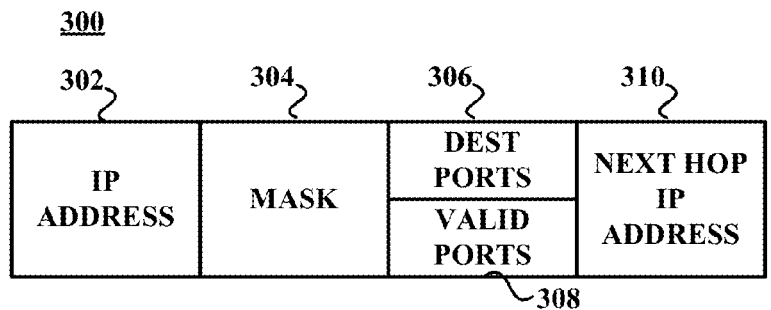
FIG. 3 is a diagram illustrating an example of a lookup database entry, consistent with some embodiments.

FIG. 3 is a diagram illustrating an example of a lookup database entry, consistent with some embodiments. As shown in FIG. 3, lookup database entry 300 may include fields for an internet protocol (IP) address 302, a field for a mask entry 304, a field for destination ports 306, a field for valid ports 308, and a field for a next hop IP address 310. The fields shown in database entry 300 are exemplary only, and may include other fields for other values. According to some embodiments, the IP address 302 may be a source or a destination IP address, and mask 304 may be a subnet mask. Valid ports 308 may indicate the valid ports for a particular destination address. Consistent with some embodiments, an L2 lookup performed by L2 lookup engine 208 may perform a lookup in an exact prefix match database 210 to determine if an exact prefix match exists for a particular MAC address which will determine if information 204 is to be terminated at switching system 200 or at another switching system 200 within the same node. According to some embodiments, an L3 lookup performed by L3 lookup engine 214 may determine a longest prefix match or exact match of a destination port 306 from longest prefix match database 216 or exact match database 210 and/or a next hop IP address 310 from a lookup in TCAM 218 followed by an RLDRAM and/or SRAM access.

One of the more important features of network systems 100, including individual nodes, and network systems 200 is bandwidth. In order to maximize bandwidth, each port of a network system 100 may be characterized for the highest speed traffic it is designed to support. The highest speed traffic is generally given as a limitation as to how many bits can be reliably passed over a medium during a designated time, such as 100 gigabits per second (Gbps). Once this limitation is imposed, the rest of the system design ensures that the limitation is met at all other system components, particularly the lookup system which is integral for forwarding or discarding each and every packet in information 204 that is received by network system 200. Advancements in memory technology have been able to improve the required bandwidth of the databases used by the lookup engine by double or even quadruple scales. Keeping up with the bandwidth requirement of the lookup engine is a critical piece of the system design. While advancement of technology leads to faster movements of bits, it all the same presents increased processing requirements in terms of packets per second at all other design points.

Consistent with some embodiments, scaling L2 or L3 processing may be more difficult to achieve than scaling L1 processing. Moreover, the scaling of L2 and L3 processing can be seen as a bottleneck in improving overall performance and increasing bandwidth. This is because both an L2 lookup and an L3 lookup involves multiple search requests at multiple parallel points and a consolidation of the result. Further, due to design requirements, different memory devices may be used to store databases accessed by the lookup engines. For example, as described above in FIG. 2, the L2 and L3 lookup engines may perform lookups in SRAMs, RLDRAMs, and/or TCAMs, which may be internal or "intra-chip" lookups, or external or "inter-chip" lookups. The memory devices may also be specific to a particular algorithm or search method employed and support different response times based on specifications across generations.

Figure 4:
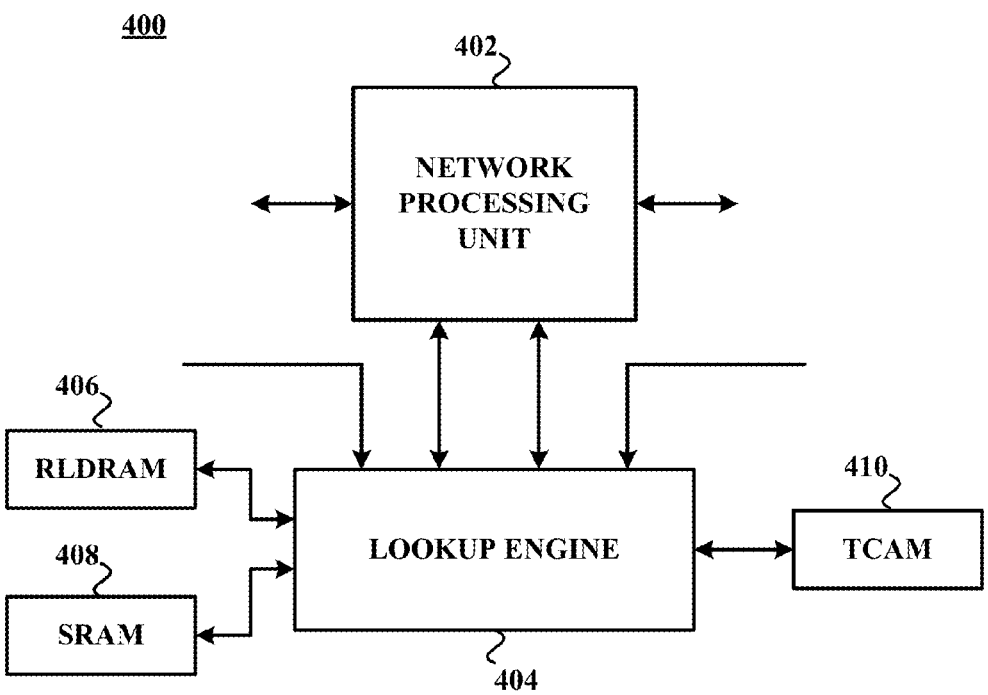
FIG. 4 is a diagram illustrating a basic lookup system, consistent with some embodiments.

FIG. 4 is a diagram illustrating a basic lookup system, consistent with some embodiments. As shown in FIG. 4, lookup system 400 includes a network processing unit (NPU) 402 coupled to lookup engine 404, which is coupled to memory devices 406, 408, and 410, which store databases for the lookup. Consistent with some embodiments, memory device 406 may be an RLDRAM, memory device 408 may be an SRAM, and memory device 410 may be a TCAM. Moreover, memory devices 406-410 may be on a same chip as lookup engine 404, or may be on a different chip. Lookup engine 404 may communicate with NPU 402 using an industry-known interface such as Interlaken or the 10 Gigabit Attachment Unit Interface (XAUI) if lookup engine 404 is located on a separate chip from NPU 402. In operation, information is transmitted to and from NPU 402 over a network interface. According to some embodiments, information may include packets. On the ingress side, NPU 402 stores the information in a memory through a data structure based memory management mechanism. If the information includes packets, the packet is stored along with its header information for L2 and L3 processing. Through a key generation process one to four keys may be generated by NPU from the stored packet header information. In one embodiment, through a defined request/response mechanism, the keys may be packed into lookup packets and transmitted to lookup engine 404. Lookup engine 404 extracts the keys from the lookup packets and determines the type of lookup to perform from the key. For example, the key may indicate that lookup engine 404 perform an L2 packet lookup, an L3, packet lookup, an IPv4 lookup or an IPv6 lookup. Based on the type of lookup indicated, the key is sent to one or more databases in memory devices 406-410. In one embodiment, the result of the lookup is packaged into a single response packet by lookup engine 404, wherein the response packet similarly may have multiple results, each corresponding to a key. Response packets are transmitted from lookup engine 404 to NPU 402. A single response packet is generated to synchronize through slowest path equalization so that a response is not sent until all lookups have been completed. In one embodiment, a response packet may then be sent. However, the time between the reception of the information packets, in some embodiments, and the receipt of the response packets affects several buffer parameters in NPU 402 and, indirectly, the overall packet processing rate.

Figure 5:
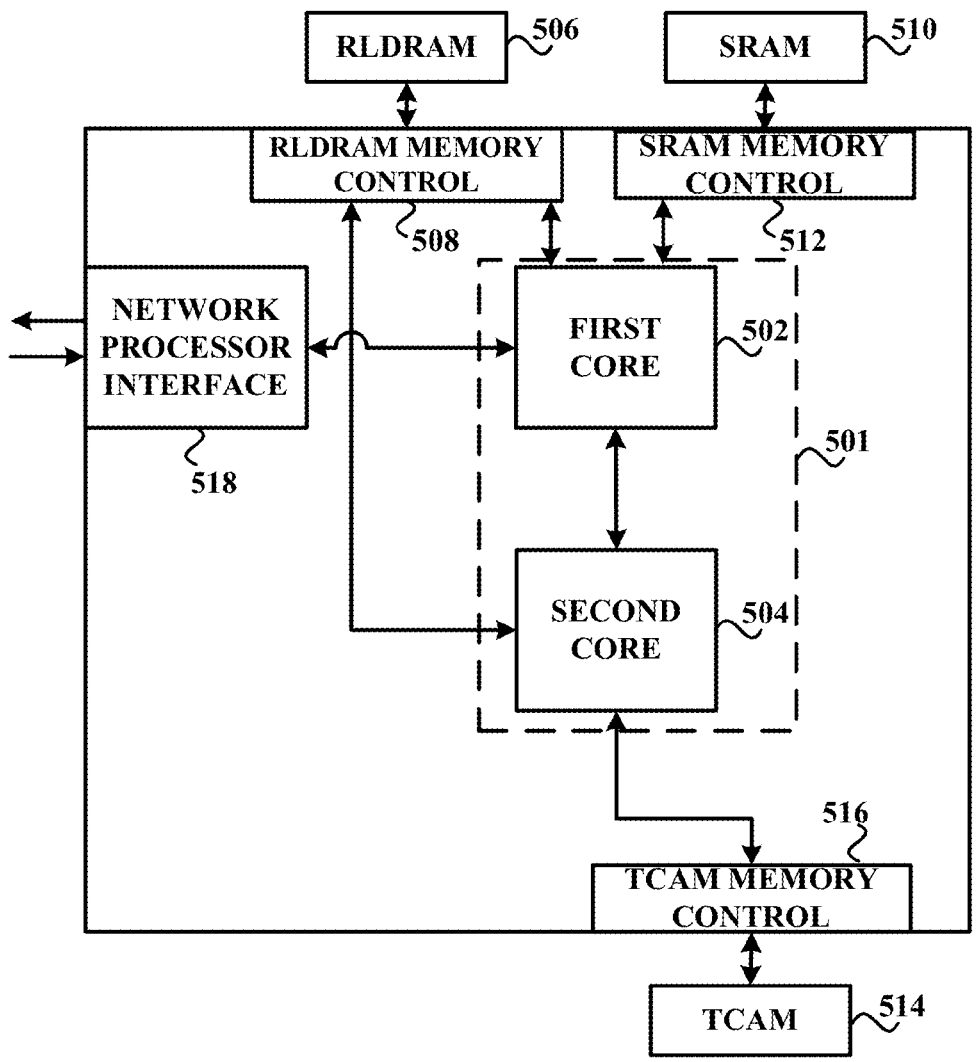
FIG. 5 is a diagram illustrating a lookup engine, consistent with some embodiments.

FIG. 5 is a diagram illustrating a lookup engine, consistent with some embodiments. Lookup engine 500 may correspond to lookup engine 404 in FIG. 4, or either of lookup engine 208 or 212 in FIG. 2. As described above, a certain bandwidth or throughput, a certain minimum information arrival time has to be supported. For example, to support a rate of 100 Gbps, for a minimum size packet of 64 bytes, a packet has to be supported every 6.6 ns in order for the lookup engine to sustain this rate of packet arrival throughout. If the core clock of the system and the memory is clocked at 3.3 ns, each packet lookup has to be completed in two cycles.

As shown in FIG. 5, lookup engine 500 may include a lookup core 501 that includes a first core 502 and a second core 504. Consistent with some embodiments, first lookup core 502 is coupled to lookup databases stored on an RLDRAM 506 via a RLDRAM memory controller 508 and an SRAM 510 via an SRAM memory controller 512. Second lookup core 504 is coupled to lookup databases stored on RLDRAM 506 via RLDRAM memory controller 508 and TCAM 514 via a TCAM memory controller 516. First lookup core 502 is coupled to a network processor interface 518, which is coupled to a NPU (not shown), such as NPU 402. Network processor interface 518 receives packets from an NPU, extracts the keys from the packets, and sends the keys to first lookup core 502. First lookup core 502 may then parse the received keys and issue database requests to RLDRAM 506 via RLDRAM memory controller 508 and SRAM 510 via an SRAM memory controller 512. In one embodiment, if first lookup core 502 determines that a database request needs to be issued to TCAM 514, the key is transmitted to lookup core 504 to perform a lookup in a database stored on TCAM 514. According to some embodiments, second lookup core 504 may directly obtain keys from network processor interface 518.

Consistent with some embodiments, DRAM memory controller 508, SRAM memory controller 512, and TCAM memory controller 516 may be used through either a single access or multiple accesses for performing an exact match (EM) search, a longest prefix match (LPM) search, or a TCAM search. Because the EM, LPM, and TCAM searches all utilize complex algorithms to calculate addresses of the databases, evaluate results and generate further processing, these algorithms, along with the memory control interfaces, are needed to be improved in order to improve the speed of lookups, in particular to scale the bandwidth of lookup device.

For example, in order to scale the performance of lookup engine 500 from, for example, 100 Gbps to 200 Gbps, a packet has to be processed every 3.3 ns or one packet every core cycle, based on the timings discussed previously. Further, at least five DRAM requests must be processed every core cycle and the processing rates of first lookup core 502 and second lookup core 504 must also be doubled for performing EM, LPM, and TCAM lookup algorithms at a doubled rate. These algorithm implementations may be performed more quickly by reducing the clock period to sub 3.3 ns. However, this may be costly and will require pipeline and/or additional technological upgrade redesigns to accommodate the lower clock period.

Figure 6:
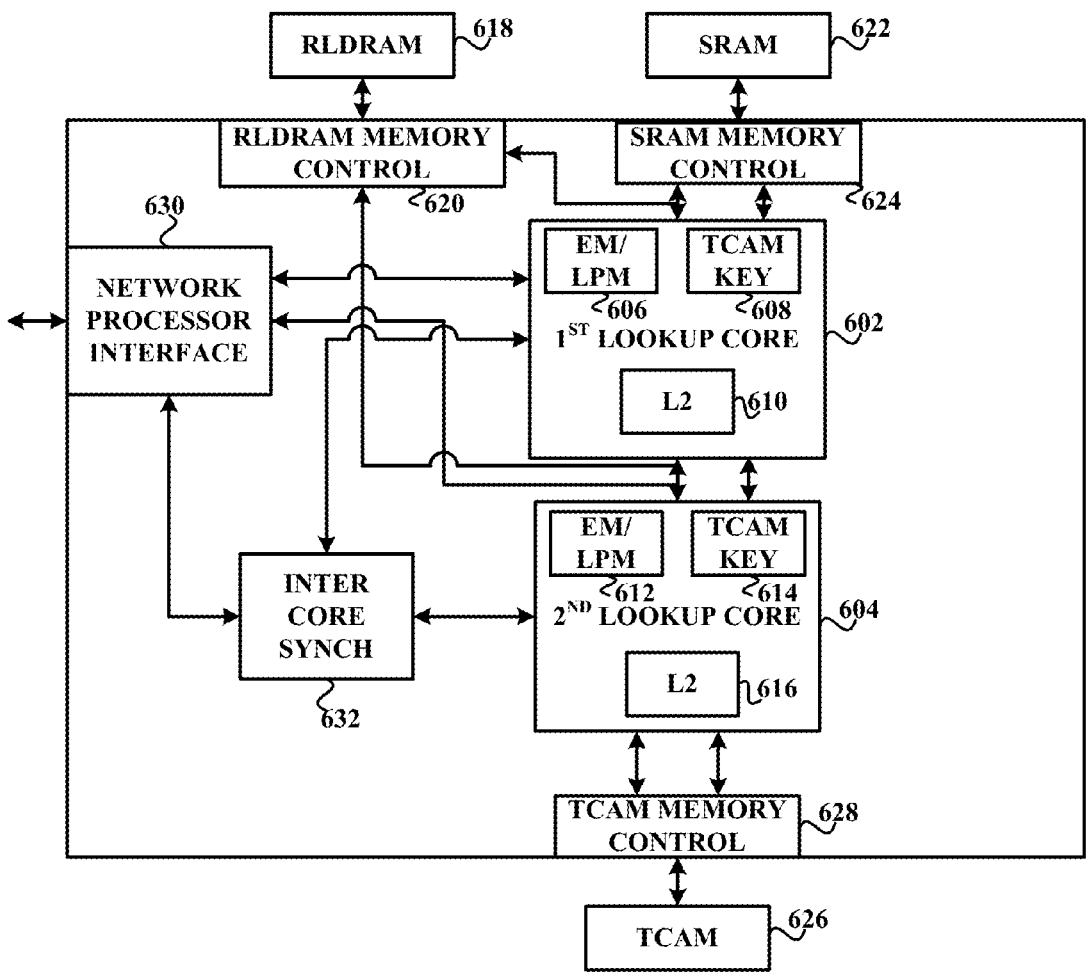
FIG. 6 is a diagram illustrating a lookup engine consistent with some embodiments.

FIG. 6 is a diagram illustrating a lookup engine consistent with some embodiments. As shown in FIG. 6, lookup engine 600 may correspond to lookup engine 404 in FIG. 4, or either of lookup engine 208 and/or 212 in FIG. 2. Lookup engine 600 may include two lookup cores, a first lookup core 602 and a second lookup core 604 that together spatially duplicate the functionality of lookup core 501 shown in FIG. 5. First lookup core 602 includes processing modules for performing EM and LPM lookups 606, TCAM lookups 608, and L2 lookups 610. Similarly, second lookup core 604 includes processing modules for performing EM and LPM lookups 612, TCAM lookups 614, and L2 lookups 616. Consistent with some embodiments, processing modules 606-616 may correspond to instructions stored on a memory associated with first lookup core 602 and lookup core 604 that, when executed by one or more processors associated with first lookup core 602 and second lookup core 604, perform algorithms for conducting EM, LPM, TCAM, and L2 lookups. Alternatively, processing modules 606-616 may be embodied as discrete application specific integrated circuits (ASICs) integrated on a same chip as first lookup core 602 and second lookup core 604, operating in parallel.

Consistent with some embodiments, first lookup core 602 is coupled to lookup databases stored on an RLDRAM 618 via a RLDRAM memory controller 620 and an SRAM 622 via an SRAM memory controller 624. Second lookup core 604 is coupled to lookup databases stored on RLDRAM 618 via RLDRAM memory controller 620 and TCAM 626 via a TCAM memory controller 628. First lookup core 602 and second lookup core 604 are both coupled to a network processor interface 630, which is coupled to a NPU (not shown), such as NPU 402. RLDRAM 618, SRAM 622, and TCAM 626 may be located external to lookup engine 600, or may be located on the same integrated circuit or chip as lookup engine 600. Moreover, RLDRAM 618, SRAM 622, and TCAM are shown only as a single block or device in FIG. 6, but may include one or more memories wherein each memory is provided with one or more interface ports by its respective memory controller for interfacing with lookup core 602 and/or lookup core 604. Consistent with some embodiments, RLDRAM memory controller 620 provides a plurality of interfaces for multiple simultaneous accesses for processing lookups in RLDRAM 618, such as EM and/or LPM lookups. TCAM memory controller 628 may also include a plurality of interfaces for handling multiple transmission paths for processing lookups in TCAM 626. Further consistent with some embodiments, memory 620, 624 and 626 are scaled in time to be either doubled or quadrupled from a normal timing that, when combined with the spatial duplication of lookup core 501 as first lookup core 602 and second lookup core 604 effectively scale the bandwidth of lookup engine 600.

Network processor interface 630 receives lookup packets from an NPU, extracts keys lookup packets and sends the keys to first lookup core 602 and second lookup core 604. First lookup core 602 may then parse the received keys and issue database requests to RLDRAM 618 via RLDRAM memory controller 620 and SRAM 622 via an SRAM memory controller 624. In parallel, second lookup core 604 may parse the received keys and issue database requests to RLDRAM 618 via RLDRAM memory controller 620 and TCAM 626 via an TCAM memory controller 628. First lookup core 602 and second lookup core 604 operate in parallel, capable of generating parallel accesses to TCAM 626, SRAM 622, and RLDRAM 618. In one embodiments, keys extracted from the same packets are sent to the same core 602 or 604. Responses are sent from cores 602 and 604 to inter-core synchronization module 632, which merges the responses from first lookup core 602 and second lookup core 604 so that only a single response stream is sent to network processor interface 630 and then to the NPU once it has been marked as done or completed. Consistent with some embodiments, inter-core synchronization module may include a consecutive selection multiplexer configured to alternately receive a lookup response received from first lookup core 602 and second lookup core 604. The keys are associated with their packets and all keys associated with a packet are dispatched to the same core, and are tracked using sequence identification (Sequence ID). Sequence IDs are tracked in each core for only the Sequence IDs that it handles. That is, first lookup core 602 does not track the status of keys and their associated sequence IDs that are sent to second lookup core 604, and vice versa.

As described above, memory controllers 620, 624, and 628 include a plurality of interfaces for handling multiple simultaneous accesses from first lookup core 602 and second lookup core 604. Further, first lookup core 602 and second lookup core 604 have interfaces capable of supporting multiple simultaneous accesses from their respective cores. As shown in FIG. 6, which is an example, the number of memory controller input ports have been doubled. Thus, by increasing the clock of the memory devices such that RLDRAM 618 can process two operations per 3.3 ns (666 MHz) and TCAM 626 can process one transaction per cycle, and by doubling the memory access paths to the cores, then speed the memory interface, effectively doubling the throughput.

Figure 7:
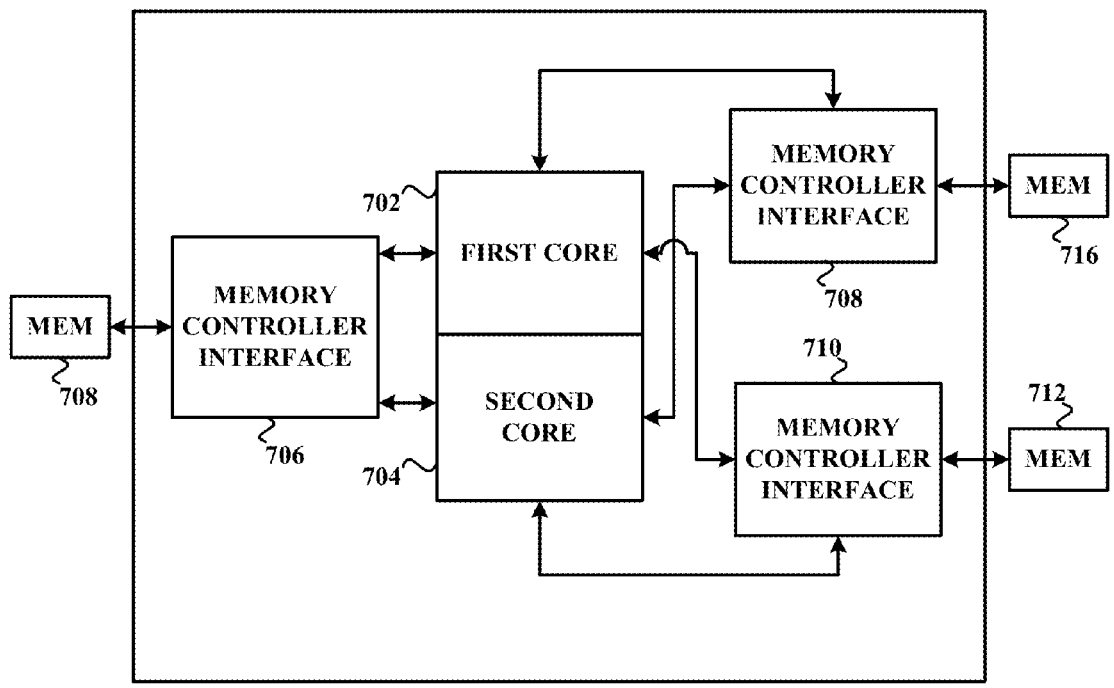
FIG. 7 is a diagram illustrating a lookup core in communication with a memory controller, consistent with some embodiments.

FIG. 7 is a diagram illustrating a lookup core in communication with a memory controller, consistent with some embodiments. As shown in FIG. 7, a lookup core 700, such as first lookup core 602 or second lookup core 604, includes at least a first core 702 and a second core 704. Further, as described above, a memory controller, such as DRAM memory controller 620, SRAM memory controller 624, and TCAM memory controller 628, includes one or more interface ports for each individual memory device coupled to the controller. As shown in FIG. 7, first memory controller interface 706 is coupled to first memory device 708, second memory controller interface 710 is coupled to second memory device 712, and third memory controller interface 714 is coupled to third memory device 716. Each memory controller interface 706, 710, and 714, is also coupled to both first core 702 and second core 704 providing two pathways to each memory device 708, 712, and 716 for a lookup core 602 or 604. Memory devices 708, 712, and 716, may correspond to any of RLDRAM 618, SRAM 622, or TCAM 626, and memory controller interfaces 706, 710, and 714 may be included in any of DRAM memory controller 620, SRAM memory controller 624, or TCAM memory controller 628.

As an example, memory devices 708, 712, and 716 may correspond to RLDRAM 618, memory controller interfaces 706, 710, and 714 may be included in DRAM memory controller 620, and first core 702 and second core 704 may be included in first lookup core 602. In order to double a lookup speed, first lookup core 602 includes first core 702 and second core 704, wherein each core is in communication with a memory controller interface 706, 710, and 714 of DRAM memory controller 620, which effectively doubles the speed of first lookup core 602 by providing two simultaneous access paths between first lookup core 602 and DRAM memory controller 620, without actually increasing the clock of first lookup core 602, due to parallel processing by first core 702 and second core 704.

Figure 8:
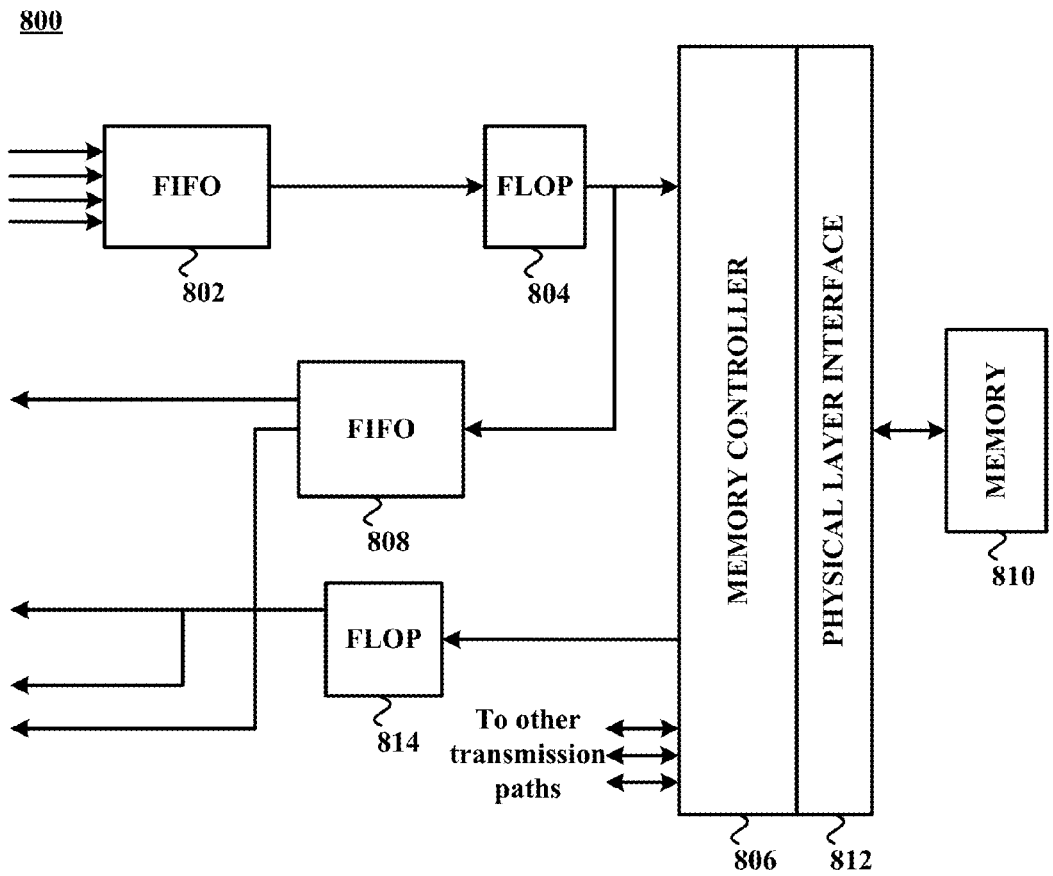
FIG. 8 is a diagram illustrating an access path from a core to a memory controller interface, consistent with some embodiments.

FIG. 8 is a diagram illustrating memory read request paths from a core to a memory controller interface, consistent with some embodiments. The memory read request paths 800 shown in FIG. 8 may correspond to simultaneous access paths from first core 702 or second core 704 to any of memory controller interfaces 706, 710, or 714. As shown in FIG. 8, information sent from a core interface 702 or 704 is first received by a first-in first-out (FIFO) memory 802 of a memory controller interface 706, 710, or 714. As shown in FIG. 8, FIFO memory 802 is a four port memory, capable of receiving information on four ports from a core. According to some embodiments, FIFO memory 802 may have more or less ports. FIFO memory 802 sends the received information to flip-flop 804 in a first-in first-out manner. Flip-flop 804 sends the received information to memory controller 806 and to a FIFO buffer 808, which stores each request when complete sends back to a core interface for latency matching. Memory controller 806 communicates with memory 810 through a physical layer interface 812 to perform a lookup related memory access. Consistent with some embodiments, physical layer interface may be capable of performing a standard data rate (SDR) to double data rate (DDR) conversion if required. Memory 810 may correspond to any of RLDRAM 618, SRAM 622, or TCAM 626. In one embodiments, a result of the lookup is sent back to memory controller 806 through physical layer interface 812, and then sent to a flip-flop 814 which will then transmit the result back to a core. Memory read access paths 800 may be repeated for each such path between a core and a memory controller interface, or for every multiple of ports provided by FIFO memory 802 capable of being supported by a memory controller interface. For example, if a memory controller interface supports eight ports for each transmission path to a core, there would be two access paths 800 for each access path to a core. Consistent with some embodiments, a memory controller interface may multiplex each access path on a port with equal priority. In another embodiment, the priority may be manipulated according to requirements of the lookup algorithms.

Figure 9:
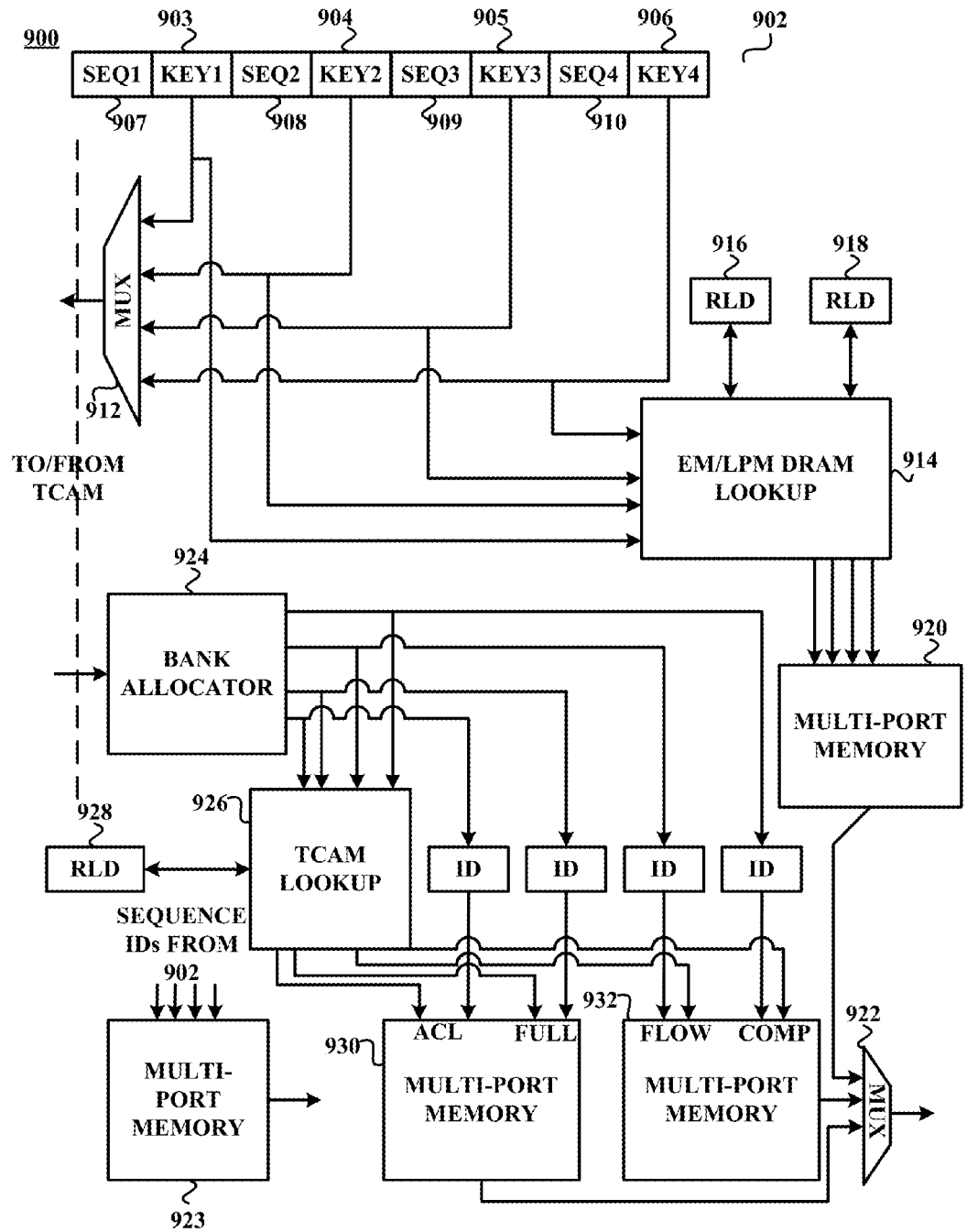
FIG. 9 is a diagram illustrating a response resolution logic data path, consistent with some embodiments.

FIG. 9 is a diagram illustrating a response resolution logic data path 900, consistent with some embodiments. According to some embodiments, response resolution logic data path illustrates details of the processing of received packets by first lookup core 602 and/or second lookup core 604 As shown in FIG. 9, a packet 902 requiring lookup includes a plurality of keys 903, 904, 905, and 906, each associated with a respective sequence ID 907, 908, 909, and 910. Each of the keys 903-906 are sent to a first multiplexer 912 and an EM and LPM DRAM lookup engine 914 based on key sequence ID. EM/LPM lookup engine 914 performs a lookup in coupled memory devices 916 and 918, which may be RLDRAM devices, receives a response, and then sends the response to multi-port memory 920. Consistent with some embodiments, EM/LPM lookup engine 914 performs a lookup for each key 903-906, and sends the response for each key to multi-port memory 920. According to some embodiments, each multi-port memory 920, 930, 932, is accessed in parallel using the sequence ID of the key, to get a result from the RLDRAM 916 or 918, EM/LPM lookup 914, or TCAM/RLDRAM provided by 926 and 928, access for an IPv6 or IPv4 path a result may then be chosen from MUX 922. If the accesses by the key generates multiple responses, one is chosen by a predetermined parameter by MUX 922.

Sequence IDs 907-910 are stored in multi-port memory 923 and are only cleared when a lookup on an associated key is completed. For example, once a lookup has been performed on key 903 and a response generated, sequence ID 907 is cleared from multi-port memory 923 and marked as done. Consistent with some embodiments, a lookup response is not sent until all predecessor sequence IDs 907-910 have been cleared from multi-port memory 923, in order to prevent skipping or other errors. That is, sequence IDs 907-910 stored in multi-port memory 923 indicate that a lookup is pending for its associated key and a response is not sent until no predecessor lookups are pending for a key with a certain sequence ID maintained by, for example, a rollover counter.

Meanwhile, first multiplexer 912 selects one key 903-906 at a time based on an opcode, for example, if a TCAM access is required, and sends the selected key to a TCAM, such as TCAM 626. A response of hit or miss and an index is received by bank allocator 924. After TCAM access, each of the indices received by bank allocator 924 are sent to memory device 928, which may be a RLDRAM device, where a result lookup is performed, and the results are sent to and stored in multi-port memory 930 and/or multi-port memory 932. Consistent with some embodiments, multi-port memory 930 may store for resolution results for an access control list (ACL) search and a full, non-compressed, search, used for performing a lookup on IPv4 and IPv6 based keys, respectively. Multi-port memory 932 may store for resolution results for FLOW and compressed key or COMP searches, used for performing a lookup based on IPv4 and IPv6 based keys, respectively. Consistent with some embodiments, the results are written to multi-port memories 930 and 932 asynchronously, since the latency or completion times may be different, and identified by the sequence ID. The result stored in multi-port memories 930 and 932 are read by second multiplexer 922 in order using the sequence ID, where a lookup response based on the response from multi-port memories 930 and 932 and 920 are selectively sent to inter-core synchronization module 632.

Figure 10:
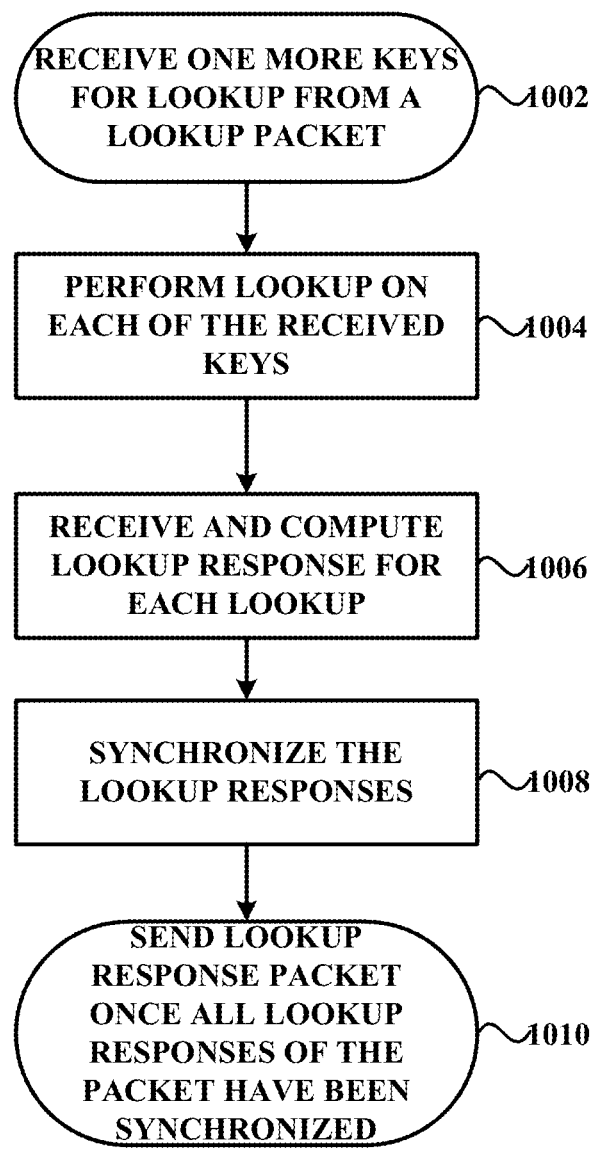
FIG. 10 is a flowchart illustrating a method for performing a lookup in a lookup engine of an information handling system, consistent with some embodiments.

FIG. 10 is a flowchart illustrating a method for performing a lookup in a lookup engine of an information handling system, consistent with some embodiments. For the purpose of discussion, the method shown in FIG. 10 will be discussed with reference to FIGS. 6-9. In one embodiment, the exchange of keys and responses is through another packet interface protocol separate from data packets received over the network. In one embodiment, this packet interface protocol is Interlaken or XAUI. Consistent with some embodiments, the method shown in FIG. 10 may be embodied in a non-transient computer-readable medium stored in a memory of or associated with lookup engine 600 that, when executed by one or more processors of or associated with lookup engine 600 cause lookup engine 600 to perform the method in FIG. 10. As shown in FIG. 10, the method begins when lookup engine 600 receives one or more keys for lookup (1002). Consistent with some embodiments, network processor interface 630 of the lookup engine may receive the one or more keys from a network processor that has extracted the keys from packets. A lookup may then be performed on each of the received keys (1004). Consistent with some embodiments, the received keys are sent to first lookup core 602 or second lookup core 604, which may perform an exact match, longest prefix match, TCAM, or L2 lookup on the received keys by sending a lookup request over multiple transmission paths to a memory controller, such as DRAM controller 620, SRAM controller 624, or TCAM controller 628, which performs the lookup in a memory device, such as RLDRAM 618, SRAM 622, or TCAM 626 and its associated RLDRAM. A response is then received and computed for each lookup (1006). Consistent with some embodiments, a memory controller, such as DRAM controller 620, SRAM controller 624, or TCAM controller 628, which performs the lookup in a memory device, such as RLDRAM 618, SRAM 622, or TCAM 626 and its associated RLDRAM may transmit the received lookup response to first core 602 and second core 604 over multiple paths. The multiple lookup responses are then resolved based on protocol and network architecture imposed priority. Such resolved responses are sent out by each core 602 and 604. Consistent with some embodiments, first core 602 and second core 604 send the received completed responses to inter-core synchronization module 632 which stores a sequence identification for each key in a memory, and synchronizes the responses by removing a sequence identification from the memory when a response for a particular key is received (1008). A lookup response packet may then be sent once all lookup responses have been synchronized by inter-core synchronization module 632 (1010). If paths between core 602 and 604 are identical inter-core synchronization module 632 may include another structure such as multi-port memories 930 and 932 to retrieve received responses from a core in order if so required by the NPU.

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consequently, embodiments as described herein may provide a lookup engine in an information handling system that is able to process lookups more quickly and efficiently by utilizing multiple lookup cores that communicate lookup requests over multiple execution paths. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. An information handling system, comprising a lookup engine configured to receive lookup packets, extract keys from the lookup packets, and perform one or more lookups based on the extracted keys, the lookup engine comprising:
   a network processor interface;
   a first lookup core coupled to the network processor interface;
   a second lookup core coupled to the network processor interface;
   at least one memory controller coupled to the first lookup core and the second lookup core, the at least one memory controller receiving a plurality of search requests over multiple independent paths from each of the first lookup core and the second lookup core, performing a lookup in a coupled memory device, and sending a lookup response, wherein the multiple independent paths allow the at least one memory controller to concurrently receive the plurality of search requests from the first and second lookup cores; and
   an inter-core synchronization module coupled with the first lookup core, the second lookup core, and the network processor interface, the inter-core synchronization module comprising a memory, wherein the inter-core synchronization module is configured to:
      store a sequence identification for each key received by the network processor interface;

receive lookup responses from the first lookup core and the second lookup core;

mark as done the stored sequence identification for a particular key when a lookup response corresponding to the particular key is received from the first lookup core or the second lookup core; and send a response packet to the network processor interface when lookup responses for each key have been received and after all of the stored sequence identifications have been marked as done.

2. The information handling system of claim 1, wherein the coupled memory device comprises at least one of a static random access memory (SRAM), a reduced latency dynamic random access memory (RLDRAM), and a ternary content addressable memory (TCAM).

3. The information handling system of claim 1, wherein the one or more lookups comprise at least one of an exact match (EM) lookup, a longest prefix match (LPM) lookup, and a layer 2 (L2) lookup.

4. The information handling system of claim 3, wherein the first lookup core and the second lookup core comprise an EM and LPM module and an L2 lookup module.

5. The information handling system of claim 1, wherein the inter-core synchronization module comprises a consecutive selection multiplexer configured to alternately receive a lookup response received from the first lookup core and the second lookup core.

6. The information handling system of claim 1, wherein the memory controller comprises at least one memory controller interface coupled to the first lookup core and the second lookup core over at least two access paths to each of the first lookup core and the second lookup core.

7. A device for performing lookups over a plurality of network layers in an information handling system, comprising:

a network processor interface configured to receive lookup packets and extract keys from the lookup packets;

a first lookup core coupled to the network processor interface;

a second lookup core coupled to the network processor interface;

at least one memory controller coupled to the first lookup core and the second lookup core, the at least one memory controller receiving a plurality of search requests over multiple independent paths from each of the first lookup core and the second lookup core, performing a lookup in a coupled memory device, and sending a lookup response, wherein the multiple independent paths allow the at least one memory controller to concurrently receive the plurality of search requests from the first and second lookup cores;

an inter-core synchronization module coupled with the first lookup core, the second lookup core, and the network processor interface, the inter-core synchronization module comprising a memory, wherein the inter-core synchronization module is configured to:

store a sequence identification for each key received by the network processor interface;

receive lookup responses from the first lookup core and the second lookup core;

mark as done the stored sequence identification for a particular key when a lookup response corresponding to the particular key is received from the first lookup core or the second lookup core; and transmit a response packet to the network processor interface when lookup responses for each key have been received and after all of the stored sequence identifications have been marked as done.

8. The device of claim 7, wherein the plurality of network layers comprise at least one of layer 2 and layer 3.

9. The device of claim 7 wherein the coupled memory device comprises at least one of a static random access memory (SRAM), a reduced latency dynamic random access memory (RLDRAM), and a ternary content addressable memory (TCAM).

10. The device of claim 7, wherein the one or more lookups comprise at least one of an exact match (EM) lookup, a longest prefix match (LPM) lookup, and a layer 2 (L2) lookup.

11. The device of claim 10, wherein the first lookup core and the second lookup core comprise an EM and LPM module and an L2 lookup module.

12. The device of claim 7, wherein the inter-core synchronization module comprises a consecutive selection multiplexer configured to alternately receive a lookup response received from the first lookup core and the second lookup core.

13. The device of claim 7, wherein the memory controller comprises at least one memory controller interface coupled to the first lookup core and the second lookup core over at least two access paths to each of the first lookup core and the second lookup core.

14. A method for performing a lookup in a lookup engine of an information handling system, comprising:

receiving one or more keys on which a lookup will be performed;

performing a lookup on each of the received one or more keys, the lookup being performed on a memory storing one or more lookup databases by sending lookup requests on a plurality of independent paths, wherein the plurality of independent paths allows a plurality of lookup requests to be sent concurrently;

receiving a lookup response for each lookup;

synchronizing the lookup responses for each key of the received one or more keys, wherein synchronizing the lookup responses comprises storing a sequence identification for each key of the one or more keys and marking as done the stored sequence identification for a particular key when a lookup response corresponding to the particular key is received; and sending a lookup response packet once all of the lookup responses have been synchronized.

15. The method of claim 14, performing a lookup on each of the received one or more keys comprises performing at least one of an exact match (EM) lookup, a longest prefix match (LPM) lookup, and a layer 2 (L2) lookup.

16. The method of claim 14, wherein performing a lookup on each of the received one or more keys further comprises performing a lookup on at least one of a reduced latency dynamic random access memory (RLDRAM), a static random access memory (SRAM), and a ternary content addressable memory (TCAM).

17. The method of claim 14, wherein performing a lookup further comprises performing a lookup using lookup cores that are replicated in space and coupled to a memory interface for the memory that is scaled in time and lookup cores are replicated in space to scale a bandwidth of the lookup engine.

* * * * *